(12) United States Patent
Shinbo

(10) Patent No.: US 6,794,002 B2
(45) Date of Patent: Sep. 21, 2004

(54) THREE DIMENSIONAL PATTERN DECORATED ARTICLE

(75) Inventor: Korekiyo Shinbo, Tokyo (JP)

(73) Assignee: Taisei Bijutsu Printing Co., Ltd., Tokyo (JP)

( * ) Notice: Subject to any disclaimer, the term of this patent is extended or adjusted under 35 U.S.C. 154(b) by 0 days.

(21) Appl. No.: 10/329,133

(22) Filed: Dec. 24, 2002

(65) Prior Publication Data

US 2003/0232164 A1 Dec. 18, 2003

(30) Foreign Application Priority Data

Jun. 12, 2002 (JP) ........................................ 2002-171531

(51) Int. Cl.⁷ ................................................ B32B 3/00
(52) U.S. Cl. ...................... 428/40.1; 283/81; 428/41.7; 428/41.9; 428/42.1; 428/42.2; 428/42.3; 428/156; 428/157; 428/192; 428/194; 462/72
(58) Field of Search .............................. 428/40.1, 41.7, 428/41.9, 42.1, 42.2, 42.3, 156, 157, 192, 194; 283/81; 462/72

(56) References Cited

U.S. PATENT DOCUMENTS 4,678,206 A * 7/1987 Leahan ..................... 281/15 B
6,286,871 B1 * 9/2001 Spector ..................... 428/40.9

OTHER PUBLICATIONS

Patent Abstracts of Japan, Japanese Patent Publication No.: 2000–025366, 2 pages, filed Jul. 10, 1998, published Jan. 25, 2000 (in English).
Japanese Examined Utility Model Publication No.: 61–16139, 4 pages; in Japanese; abstract in English also enclosed.
Japanese Utility Model Publication No.: 1–119700, 3 pages; in Japanese; abstract in English also enclosed.
Japanese Utility Model Publication No.: 5–70596, 9 pages; in Japanese; abstract in English also enclosed.

* cited by examiner

*Primary Examiner*—Nasser Ahmad
(74) *Attorney, Agent, or Firm*—McCarter & English, LLP

(57) ABSTRACT

For a memo pad, many sheets 1 are bound at a back face as bound sheets using gum. The memo pad is provided with a cover paper on the top and a mounting paper on the bottom. The sheets 1 are printed from a central area of the sheet surface to over an outer peripheral area, with a decorative pattern. Outer peripheral non glued edges of the memo pad have a rugged shape modeled after the decorative pattern in a direction of the sheet surface and in a direction of the bound sheet thickness, such that even if the sheets 1 are turned up one by one or removed, a three dimensional decorative pattern reappears from the surface of the remaining sheets 1 to over the outer peripheral edge.

39 Claims, 9 Drawing Sheets

(a)

(a)

(b)

(a)

(b)

PRIOR ART

THREE DIMENSIONAL PATTERN DECORATED ARTICLE

BACKGROUND OF THE INVENTION

1. Field of the Invention

The present invention relates to a three dimensional pattern-decorated article, where a paper article is decorated all over with a three-dimensional pattern, to make the article conspicuous.

2. Description of the Related Art

In one decoration for paper articles such as memo pads, there is one where a pattern is printed from a sheet surface to over the edge for decoration. For the patterns, there are also those which are raised up from the edge of the article using a three-dimensional pattern, so that the decoration effect is further increased.

One example of an article for which this decoration effect is exceptional is known, for example, in Japanese Patent No. 3257981 issued to the present applicant on Feb. 18, 2002 (Patent Laid-Open Publication No. P2000-25366). As shown in FIG. 9, a memo pad has many sheets of paper 31 glued at a back face 32. An edge 33 on the front face of the memo pad is selected as a decoration section. A car is printed on each sheet 31 from a part of the sheet to over the edge 33, and even if the sheet 31 is turned up or removed, the three dimensional pattern reappears from the surface of the remaining sheet 31 to over the edge 33, so that the memo pad presents a conspicuous and aesthetic appearance.

Incidentally, for example, decoration of articles such as memo pads is a point or part decoration, which is applied only to a part of a decoration surface such as the edge. Even with such point decoration, different from an ordinary article without any decoration, depending on the article, the aesthetic appearance is improved accordingly by the decoration, and it is possible to greatly increase the commercial value.

However, since the decoration is limited to a part of the decoration surface of the article, the impression received through this is only proportionate, and particularly in the case where the article does not need to stand out, this is sufficient. However, in the case where the article itself is to be conspicuous, this is not always satisfactory, and a configuration exceeding the point decoration is preferable in order to give a stronger impression.

OBJECT OF THE INVENTION

An object of the present invention is to provide a three-dimensional pattern-decorated article, where a paper article is decorated all over with a three-dimensional pattern, so that the article itself is more conspicuous.

SUMMARY OF THE INVENTION

In one of its aspect, the present invention provides a decorated article, where many sheets printed: with a decorative pattern from a central area of the sheet to over an outer area are superposed, and the superposed sheets are bound with an adhesive agent at any edge of the sheet perpendicular to the sheet surface so that the sheets are able to be peeled off. Non glued edges of the decorated article have a rugged shape modeled after the decorative pattern in a direction of the sheet surface and in a direction of the bound sheet thickness, such that even if the sheets are turned up one by one or removed, a three dimensional decorative pattern reappears from the surface of the remaining sheets to over the non-glued edge.

In another of its aspects, the present invention provides a decorated article, where many sheets printed with a decorative pattern from a central area of the sheet to over an outer area are superposed, and the superposed sheets are bound with a high polymeric adhesive applied to any part within a back face of the sheet, so that the sheets are able to be peeled off, wherein the whole outer peripheral edge of the decorated article has a rugged shape modeled after the decorative pattern in a direction of the sheet surface and in a direction of the bound sheet thickness, such that even if the sheets are turned up one by one or removed, a three dimensional decorative pattern reappears from the surface of the remaining sheets to over the whole outer peripheral edge.

Regarding such articles, since the decorative pattern appears over the whole of the decoration surface of the article, it is possible to greatly increase the decoration effect, together with presenting a better aesthetic appearance, enabling the article itself to be made still more conspicuous. Hence, it is possible to significantly increase the commercial value of the article. For example, if the article itself is used as an advertising media, the whole article of a selected design is conspicuous as an advertising and publicity media, and visual impression is significantly increased. As a result, the advertising and publicity effect can be greatly improved.

In desirable embodiment, a fixed format may be printed on the central area of the sheet.

In alternate embodiment, a binding device or a fixed pin may be used for binding.

In another alternate embodiment, functional paper may be used.

In another alternate embodiment, the decorated articles may be constructed with the central area kept blank.

Further, in another of its aspects, the present invention provides a decorated article, where a plurality of sheets of mounting paper are printed with a decorative pattern on at least an outer peripheral area of the sheet surface, wherein the whole outer peripheral edge of the decorated article has a rugged shape modeled after the decorative pattern in a direction of the sheet surface and in a direction of the bound sheet thickness, such that even if the mounting paper is turned up one by one or removed, a three dimensional decorative pattern reappears from the surface of the remaining mounting paper to over the whole outer peripheral edge.

BRIEF DESCRIPTION OF THE DRAWINGS

Further Objects and advantages of the present invention may best be understood by reference to the following description taken in conjunction with the accompanying drawings, in which.

DETAILED DESCRIPTON OF THE INVENTION

Figure 1:
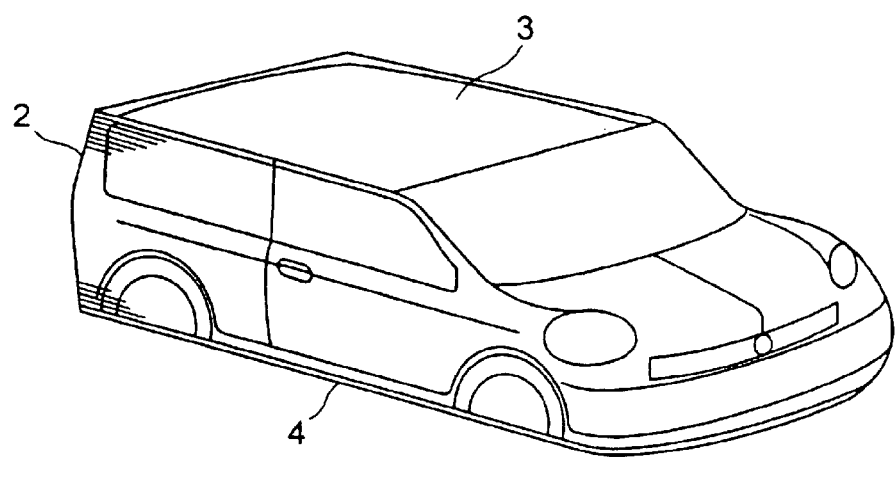
FIG. 1 shows an embodiment of an article according to the present invention, (a) being a perspective view showing a memo pad before use, and (b) being a perspective view showing the memo pad from which a cover sheet has been removed.
Figure 1:
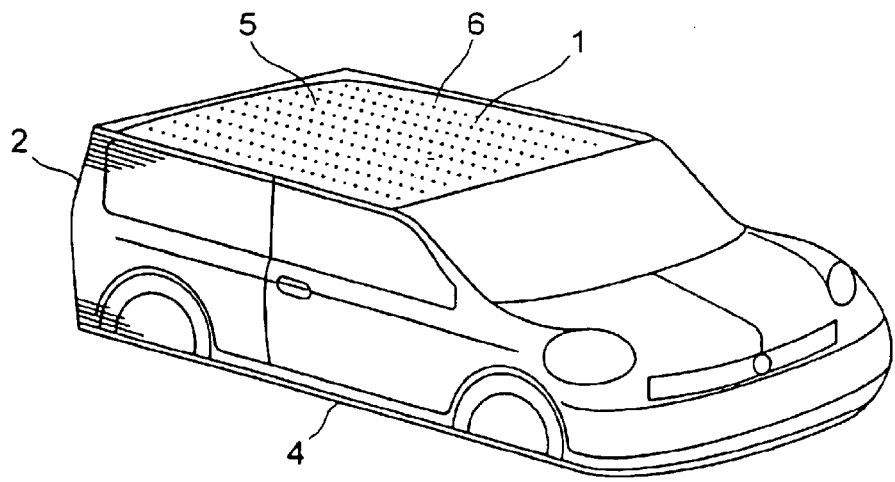

Embodiments of the present invention will be described with reference to drawings. The decorated article in this embodiment is a memo pad. In FIGS. 1(a) and (b), for this memo pad, for example 100 pieces of writing sheets 1 are bound at a back face 2 as bound sheets using a adhesive agent such as gum arabic. The outer peripheral edges other than the back face 2 of the sheet 1, which are not glued are cut out so as to have a continuous curve modeled after a later described decorative pattern. This memo pad is provided with a cover paper 3 on the top and a mounting paper 4 on the bottom.

Moreover, the sheets 1 are printed from a central area 5 of the sheet surface to over an outer peripheral area 6, with a decorative pattern of a previously selected design. The decorative pattern in this embodiment is a car. This car is printed from the central area 5 to over the outer peripheral area 6 so as to retain the integrity of the pattern. In the central area 5, at the same time is printed a fixed format for the memo pad, for example, a plurality of ruled lines. In alternate embodiment, this format printing may be omitted, leaving the whole area blank.

On the other hand, regarding the memo pad, the outer peripheral edges other than the back face 2, are cut in a curve modeled after the body lines of a complete car, in the direction of the paper surface. Also, the memo pad is cut at the front of the car in the direction of the bound sheet thickness, with curves modeled after a bonnet, a front grille, front lights and a bumper, and at the sides of the car with curves modeled after front doors, rear doors, and side bodylines.

In order to represent the profile of the car in the direction of the bound sheet thickness, it is preferable to not adhere to a detailed representation, but to three-dimensionally express only the important parts showing the characteristics of the car. As a technique for realizing a profile processes mainly for such curves, there are various kinds of methods, however, the most prevalent one is a cut out method using an ultrasonic cutter.

Figure 2:
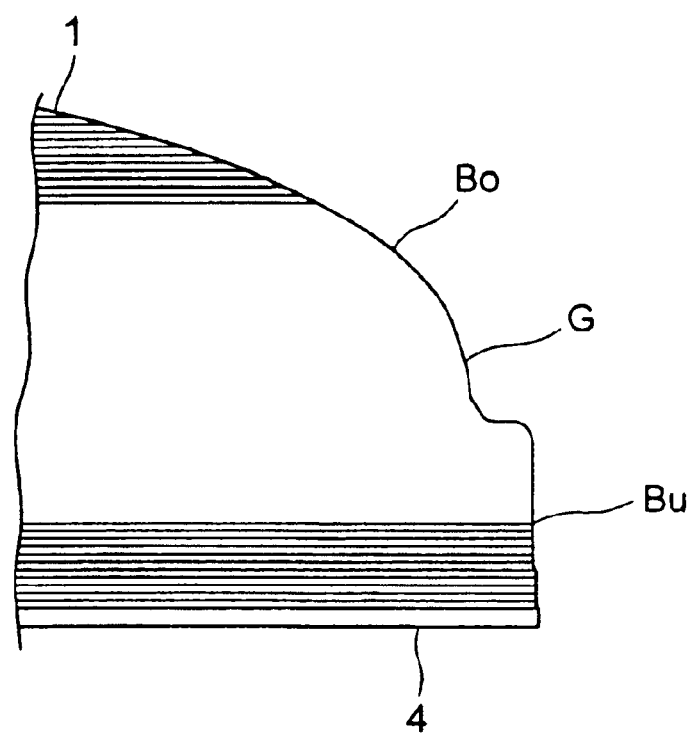
FIG. 2 is an enlarged view showing an exemplary illustration of a profile process for bound sheets according to the present invention.

FIG. 2 shows an exemplary illustration of a profile process for the bonnet, front grille, front lights and bumper section. The bound sheets are cut out sequentially for a bonnet Bo, a front grille G and a bumper Bu, retaining a smooth curve.

In such a memo pad, when the bound sheets are turned over quickly, the three dimensional bonnet, front lights, bumper and the like reappear at the non-glued outer peripheral edge of the memo pad. According to this memo pad, since the decorative pattern extends over the whole decoration surface of the article, it is possible to significantly increase the decoration effect, together with presenting a better aesthetic appearance, enabling the article itself to be made still more conspicuous. Hence, the commercial value of the memo pad can be greatly increased.

Also, by retaining the integrity of the pattern, which is indispensable for the article to present a better aesthetic appearance, it is possible to minimize any negative influence on the inherent aesthetic appearance of the pattern. On the other hand, there is no negative influence on the originally desired function for the memo pad, because of the decorative pattern.

The present embodiment may also constitute a diary or a desktop calendar using the same design as shown in the figure. In this case, a fixed format for the diary or desktop calendar is printed in the central area 5 of the surface of the sheet 1. Also, in the present embodiment, a binder may be used to bind the bound sheets.

Figure 3:
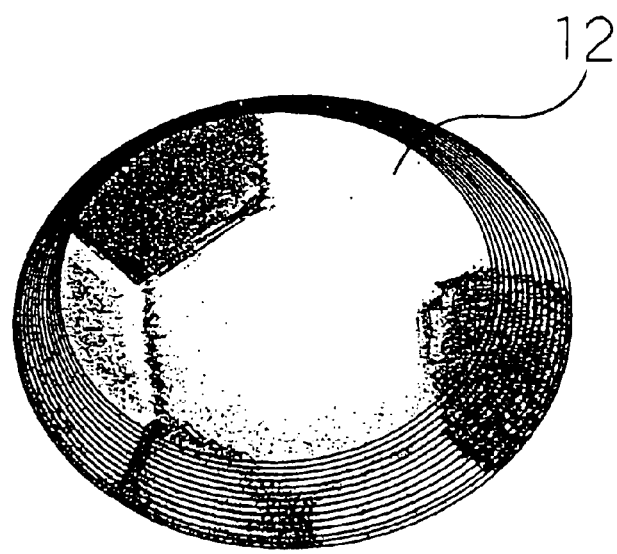
FIG. 3 shows another embodiment of a decorated article according to the present invention, (a) being a perspective view showing memo sheets before use, and (b) being a perspective view showing the memo sheets from which a cover sheet has been removed.
Figure 3:
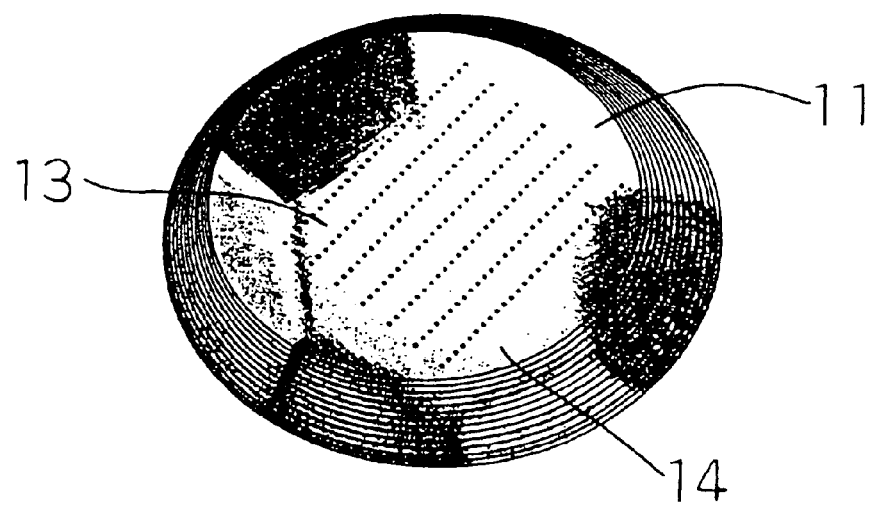

Next, an embodiment of the present invention different to that mentioned above is described with reference to FIG. 3 and FIG. 4. The article in this embodiment is memo sheets. In FIGS. 3(a) and (b), for these memo sheets an approximately central area of the back face of writing sheets 11 is spread, for example, with a high polymeric adhesive to bind together as bound sheets. The high polymeric adhesive refers to a granular pressure sensitive adhesive well known to those skilled in the art, which can be repeatedly affixed and peeled off. The whole outer area of these sheets 11 is cut out in a smooth curve modeled after a later described decorative pattern. Also, the sheets 11 are provided with a cover paper 12 on the top and mounting paper (not shown) on the bottom.

Furthermore, the sheets 11 are printed from a central area 13 of the sheet surface to over an outer peripheral area 14, with a decorative pattern of a previously selected design. In the present embodiment, the decorative pattern is a soccer ball. In order to give a strong impression to the decorative pattern of the article, the ball is printed from the central area 13 to over the whole outer peripheral area 14 so as to retain the integrity of the pattern. In the central area 13, at the same time is printed a fixed format for the memo sheets, for example, a plurality of ruled lines.

On the other hand, regarding the memo sheets, the whole outer peripheral edge is cut out in the direction of the sheet surface in a curve modeled after the ball. Also, the memo sheets are cut out in the direction of the bound sheet thickness, similarly in a curve modeled after the ball. In order to realize a profile process mainly for such curves modeled after the ball, a cut out method by an ultrasonic cutter is used.

Figure 4:
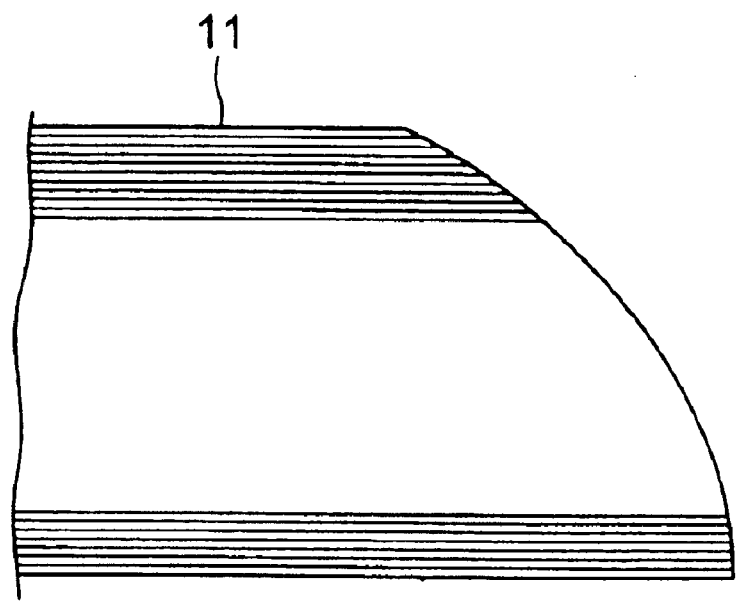
FIG. 4 is an enlarged view showing an exemplary illustration of a profile process for the bound sheets according to the present invention.

FIG. 4 shows an exemplary illustration of profile process for the ball of the present embodiment. The bound sheets are cut out, retaining the smooth curve of the ball.

In such memo sheets, when the bound sheets are turned over quickly, the three dimensional soccer ball reappears at the whole outer peripheral edge of the memo sheets. In this embodiment also, since the decorative pattern extends over the whole decoration surface of the article, it is possible to significantly increase the decoration effect, together with presenting a better aesthetic appearance. As a result, the article itself can be made still more conspicuous, and the commercial value of the memo sheets can be greatly increased.

Furthermore, particularly for circular designed articles, for example in the case where the article is used as an advertising media, the articles itself becomes an advertising and publicity media. Hence visual impression is significantly increased, and the advertising and publicity effect can be greatly improved.

Also, by retaining the integrity of the pattern, which is indispensable for the article to present a better aesthetic appearance, it is possible to minimize any negative influence on the inherent aesthetic appearance of the pattern.

Figure 5:
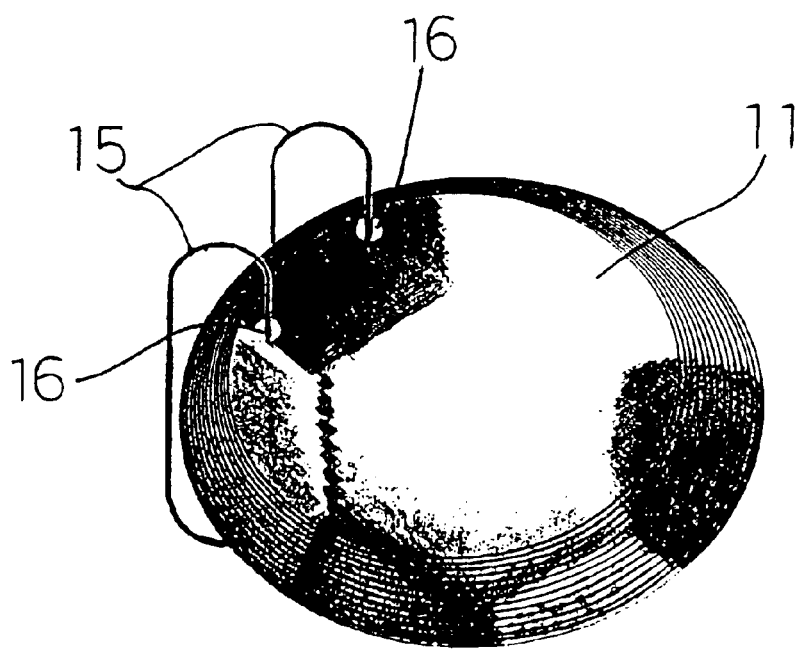
FIG. 5 is a perspective view showing another embodiment of a decorated article according to the present invention

Another embodiment of the present invention different to that mentioned above is described with reference to FIG. 5. The article of this embodiment is memo sheets. The decorative pattern is a soccer ball similar to the above-mentioned embodiment. The ball is printed from the central area 13 to over the whole outer peripheral area 14 so as to retain the integrity of the pattern. This embodiment is different in that, instead of the high polymeric adhesive, binders 15 are used to bind the many sheets 11. Through holes 16 are punched in the sheets 11, and the binders 15 are installed therein. In the case where the memo sheets are used hung by hooks (not shown), the binders 15 can be used as rings for hanging from the hooks.

In this embodiment also, since the decorative pattern extends over the whole decoration surface of the article, it is possible to significantly increase the decoration effect, together with presenting a better aesthetic appearance. As a result, the article itself can be made still more conspicuous, and the commercial value of the memo pad can be greatly increased.

In the present embodiment, instead of the binders, the sheets may be bound together, for example by one or more fixed pins installed upright on a plate. In this case, holes modeled after the fixed pin cross-section shape, such as a circle or square are punched in the sheet.

Figure 6:
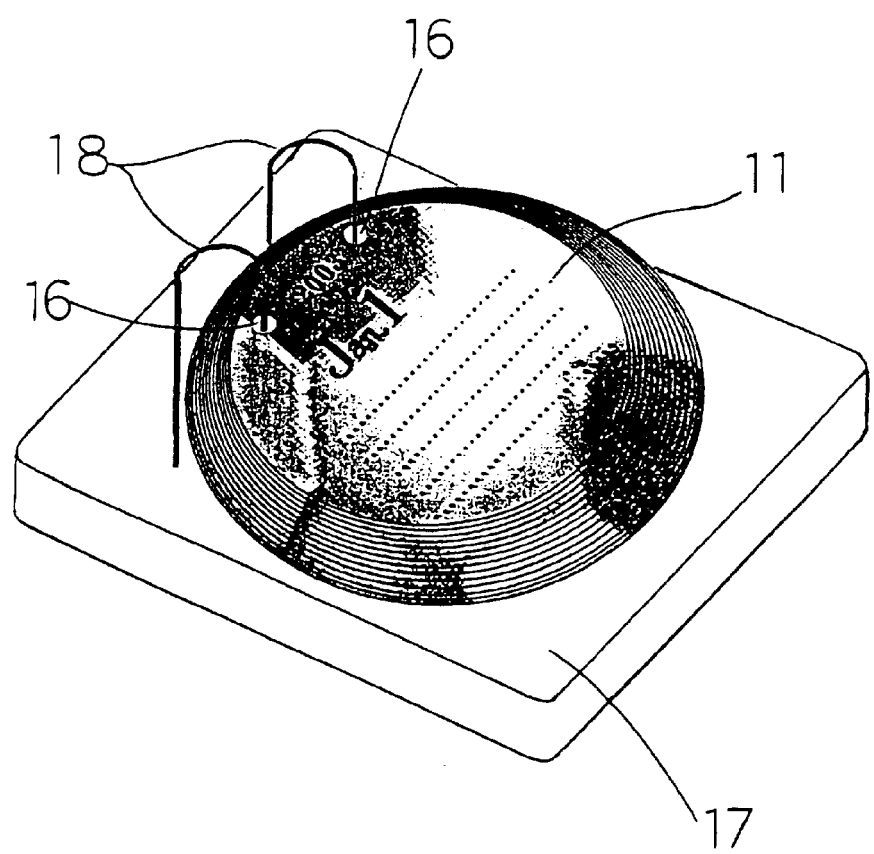
FIG. 6 is a perspective view showing another embodiment of a decorated article according to the present invention

Another embodiment of the present invention different to that mentioned above is described with reference to FIG. 6. The article of this embodiment is a diary. The decorative pattern is a soccer ball similar to the above-mentioned embodiment. This diary is constructed in combination with a plate 17. All the sheets 11 are bound by binders 18 which are fixed to the plate 17. The plate 17 is made of plastic, such as polyester, and the metal binders 18 are detachably provided.

In this embodiment also, since the decorative pattern extends over the whole decoration surface of the article, it is possible to significantly increase the decoration effect, together with presenting a better aesthetic appearance. As a result, the article itself can be made still more conspicuous, and the commercial value of the diary can be greatly increased.

In this embodiment, instead of the diary being constructed in combination with the plate 17, for example a thick board paper may be used for mounting paper, and the sheets 11 bound using suitable binders.

Figure 7:
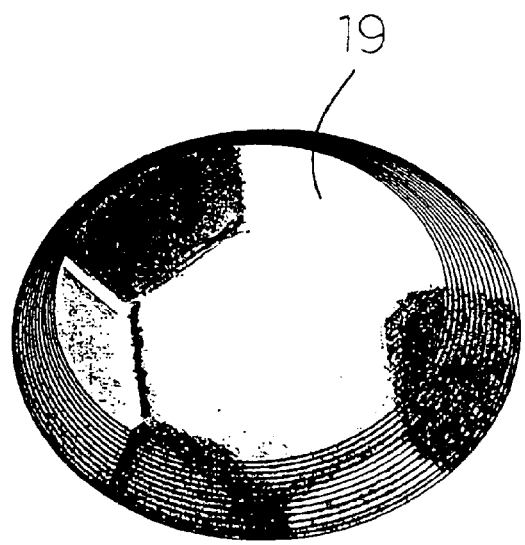
FIG. 7 is a perspective view showing another embodiment of a decorated article according to the present invention

Another embodiment of the present invention different to that mentioned above is described with reference to FIG. 7. The article of this embodiment is wiping paper. This wiping paper, uses wiping function paper 19, instead of the paper suitable for writing on of the above-mentioned embodiments. When used in this specification, function paper refers to the paper itself to which a special function is added. The function paper 19, however, is not limited to one material, and includes wiping paper, absorbing paper and the like. For wiping paper, it is preferable to use, for example, a suitable sheet with an embossing finish, and for absorbing paper, it is preferable to use a sheet which is more hygroscopic than wiping paper.

This wiping paper may be bound using a suitable adhesive agent or a binder, or may be contained in a custom-made storage box without binding.

By using such function paper, it becomes possible to obtain a more practical effect, which is not limited only to decorated articles, compared to where ordinary paper is used. Moreover, similar function paper may be used for the memo pad or the memo sheets of the previously mentioned embodiments.

Figure 8:
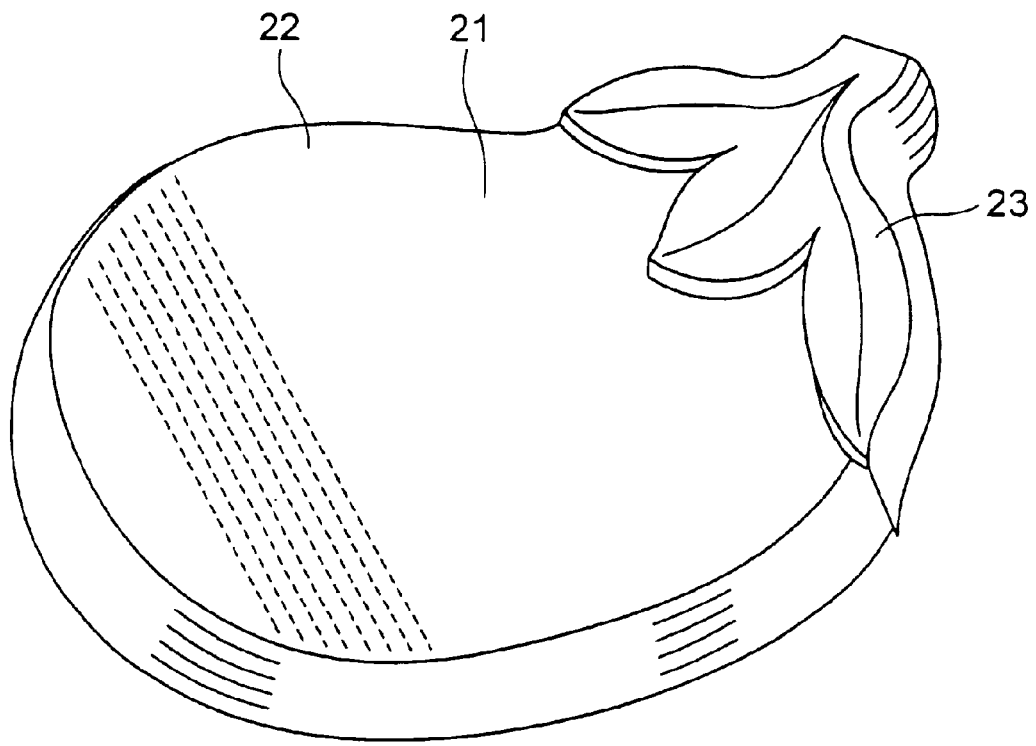
FIG. 8 is a perspective view showing another embodiment of a decorated article according to the present invention.
Figure 9:
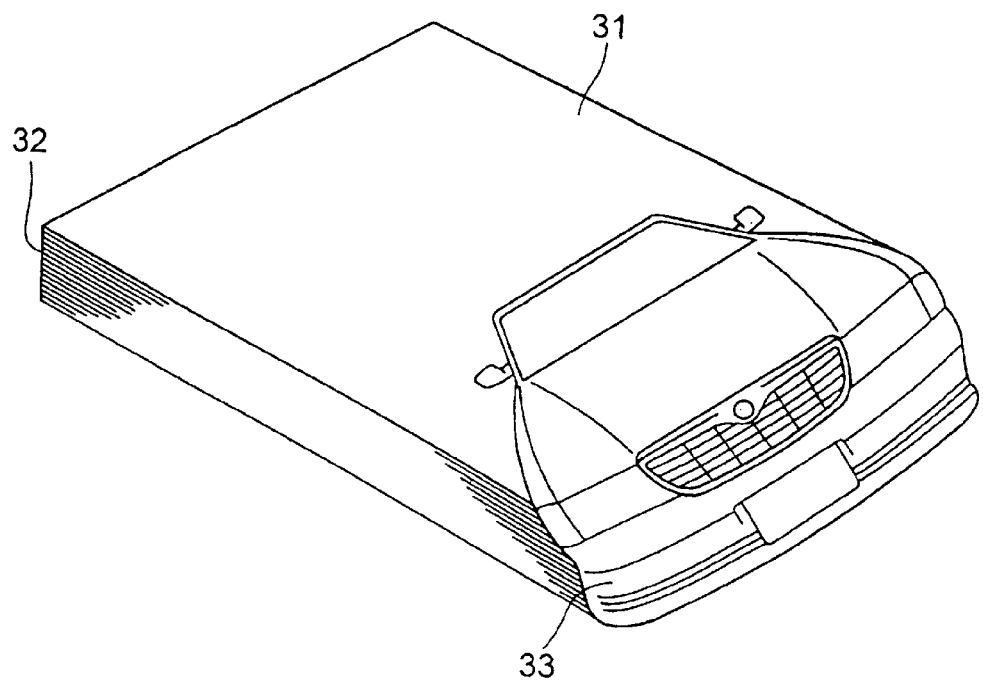
FIG. 9 is a perspective view showing an illustration of a memo pad designed previous to the present invention.

Another embodiment of the present invention different from that mentioned above is described with reference to FIG. 8. The article of this embodiment is a coaster. Respective mounting papers 21 comprise thick paper. In a central area 22 of the mounting papers 21, an embossing finish is applied to prevent slipping, and in an outer peripheral area 23, a decorative pattern of a previously selected design is printed. The respective mounting papers 21 are bound at the edge of the back face side by an adhesive agent such as gum arabic.

In this embodiment also, since the decorative pattern extends over the whole decoration surface of the article, it is possible to significantly increase the decoration effect, together with presenting a better aesthetic appearance. As a result, the article itself can be made still more conspicuous, and the commercial value of the coaster can be greatly increased.

What is claimed is:

1. A three-dimensional pattern-decorated article comprising a plurality of thin sheets, each sheet having a surface and a thickness, the surface having central and peripheral areas, wherein a decorative pattern is printed on the sheet to extend from the central area to over the peripheral area of the surface of each sheet, said sheets superposed and bound together at a portion of each sheet, wherein the non-bound portions of the sheets have a continuous profile corresponding to a pre-determined three-dimensional decorative pattern which has been printed along each sheet's surface and along each sheet's thickness, and cut along each sheet's peripheral edge; wherein when a quantity of sheets is lifted up one by one, the predetermined three-dimensional decorative pattern reappears from the printed surfaces extending over the peripheral areas of the remaining sheets.

2. The three-dimensional pattern-decorated article of claim 1, wherein the sheets are bound with an adhesive agent in the direction of the thickness of each sheet, so that the sheets may be peeled off.

3. The three-dimensional pattern-decorated article of claim 2, wherein the adhesive agent is selected from the group consisting of a gum arabic and a high polymeric adhesive.

4. The three-dimensional pattern-decorated article of claim 1, wherein the sheets are bound with a binding device.

5. The three-dimensional pattern-decorated article of claim 4, wherein the binding device is a fixed pin.

6. The three-dimensional pattern-decorated article of claim 5, wherein the binding device comprises binders.

7. The three-dimensional pattern-decorated article of claim 6, wherein the binders are detachable.

8. The three-dimensional pattern-decorated article of claim 1, further comprising a mounting paper underneath the plurality of thin sheets.

9. The three-dimensional pattern-decorated article of claim 1, further comprising a plate underneath the plurality of thin sheets.

10. The three-dimensional pattern-decorated article of claim 1, further comprising a cover paper atop the plurality of thin sheets.

11. The three-dimensional pattern-decorated article of claim 1, wherein the predetermined three-dimensional decorative pattern is selected from the group consisting of a car and a soccer ball.

12. The three-dimensional pattern-decorated article of claim 1, wherein a fixed format is printed on the central area of each sheet.

13. The three-dimensional pattern-decorated article of claim 12, wherein the fixed format comprises a plurality of ruled lines.

14. The three-dimensional pattern-decorated article of claim 12, wherein the fixed format is adapted for the article's use as one of: a memo pad, a diary and a calendar.

15. The three-dimensional pattern-decorated article of claim 1, wherein the plurality of thin sheets are sheets of functional paper.

16. The three-dimensional pattern-decorated article of claim 15, wherein the functional paper is selected from the group consisting of wiping paper and absorbing paper.

17. A three-dimensional pattern-decorated article comprising a plurality of thin sheets, each sheet having a surface, an edge and a thickness, the surface having central and peripheral areas, wherein a decorative pattern is printed on each sheet to extend from the central area to over substantially the entire peripheral area of the surface of each sheet, said sheets being superposed and bound at an approximately central area of each sheet wherein the sheets can be lifted up one by one in any direction and wherein the edges of the sheets together form a peripheral edge having a continuous profile corresponding to a predetermined three-dimensional decorative pattern along each sheet's surface and cut into and along each sheet's thickness, so that if a quantity of sheets is lifted up one by one, the predetermined three-dimensional decorative pattern reappears from the printed and cut surfaces extending to over the peripheral edge of the remaining sheets.

18. The three-dimensional pattern-decorated article of claim 17, wherein the sheets are bound with an adhesive agent along the edge of each sheet, so that the sheets may be peeled off.

19. The three-dimensional pattern-decorated article of claim 18, wherein the adhesive agent is selected from the group consisting of a gum arabic and a high polymeric adhesive.

20. The three-dimensional pattern-decorated article of claim 17, wherein the sheets are bound with a binding device.

21. The three-dimensional pattern-decorated article of claim 20, wherein the binding device is a fixed pin.

22. The three-dimensional pattern-decorated article of claim 21, wherein the binding device comprises binders.

23. The three-dimensional pattern-decorated article of claim 22, wherein the binders are detachable.

24. The three-dimensional pattern-decorated article of claim 17, further comprising a mounting paper underneath the plurality of thin sheets.

25. The three-dimensional pattern-decorated article of claim 17, further comprising a plate underneath the plurality of thin sheets.

26. The three-dimensional pattern-decorated article of claim 17, further comprising a cover paper atop the plurality of thin sheets.

27. The three-dimensional pattern-decorated article of claim 17, wherein the predetermined three-dimensional decorative pattern is selected from the group consisting of a car and a soccer ball.

28. The three-dimensional pattern-decorated article of claim 17, wherein a fixed format is printed on the central area of the sheet.

29. The three-dimensional pattern-decorated article of claim 28, wherein the fixed format comprises a plurality of ruled lines.

30. The three-dimensional pattern-decorated article of claim 28, wherein the fixed format is adapted for the article's use as one of: a memo pad, a diary and a calendar.

31. The three-dimensional pattern-decorated article of claim 17, wherein the plurality of thin sheets are sheets of functional paper.

32. The three-dimensional pattern-decorated article of claim 31, wherein the functional paper is selected from the group consisting of wiping paper and absorbing paper.

33. A three-dimensional pattern-decorated article comprising a plurality of sheets, each sheet having a surface, an edge and a thickness, the surface having central and peripheral areas, wherein a decorative pattern is printed on the sheet to extend over substantially the entire peripheral area of the surface of each sheet, said sheets being superposed so that the edges of the sheets together form a peripheral edge having a continuous profile corresponding to a predetermined three-dimensional decorative pattern along each sheet's surface and along each sheet's thickness, so that if a quantity of sheets is lifted up one by one, the predetermined three-dimensional decorative pattern reappears from the printed surfaces extending to over the peripheral edge of the remaining sheets.

34. The three-dimensional pattern-decorated article of claim 33, further comprising a suitable storage box.

35. The three-dimensional pattern-decorated article of claim 33, wherein the sheets are bound together at a portion of each sheet.

36. The three-dimensional pattern-decorated article of claim 35, wherein the sheets are bound with an adhesive agent along the edge of each sheet, so that the sheets are capable of being peeled off.

37. The three-dimensional pattern-decorated article of claim 36, wherein the adhesive agent is selected from the group consisting of a gum arabic and a high polymeric adhesive.

38. The three-dimensional pattern-decorated article of claim 33, wherein central areas of each sheet comprise embossing finish.

39. The three-dimensional pattern-decorated article of claim 17, wherein each sheet comprises one of: ordinary paper, functional paper and mounting paper.

* * * * *